July 26, 1955
E. J. ROTH
2,713,950
PLAQUE DISCHARGING MECHANISM
Filed Sept. 19, 1951
5 Sheets-Sheet 3
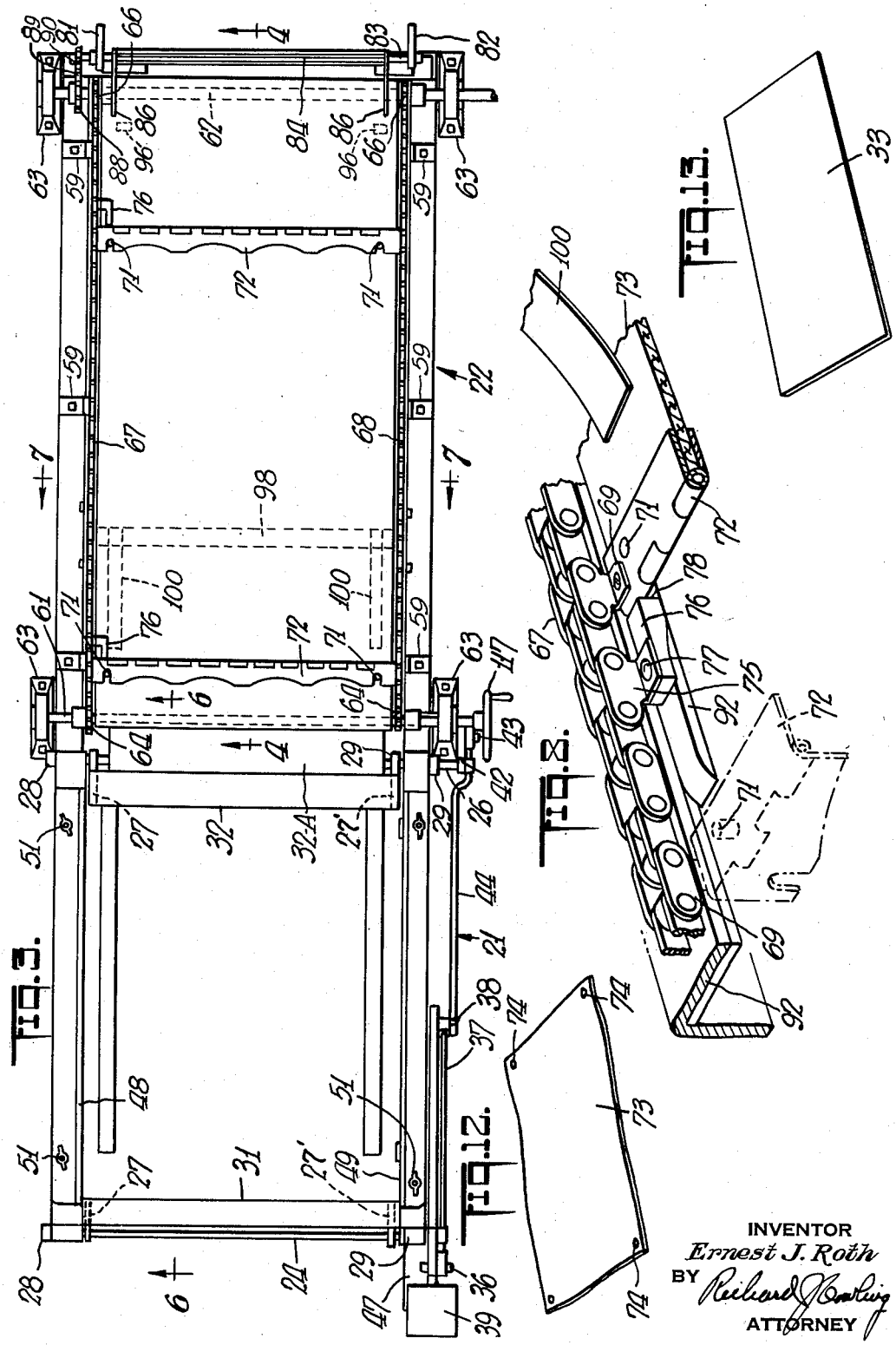
INVENTOR
*Ernest J. Roth*
BY
ATTORNEY

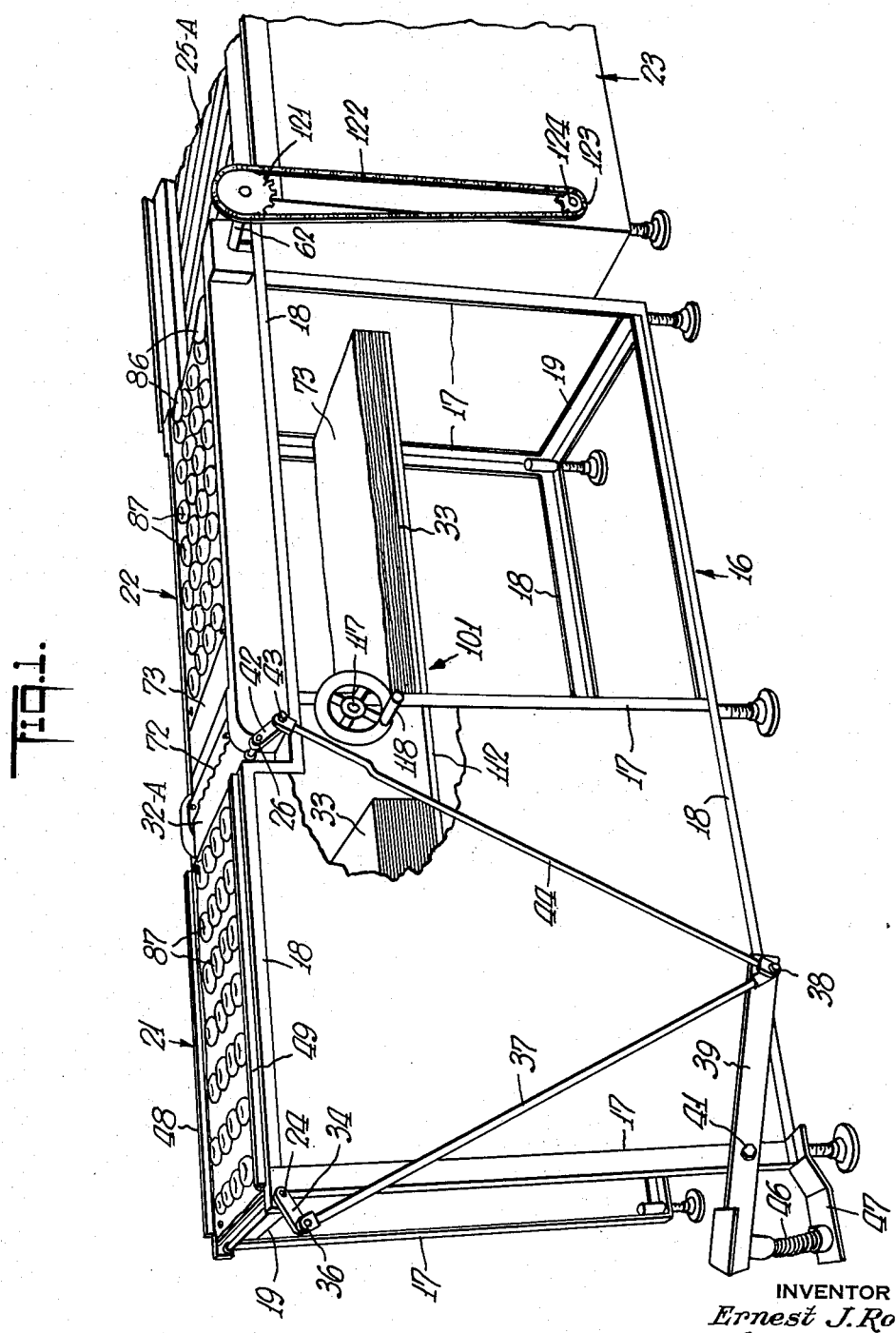

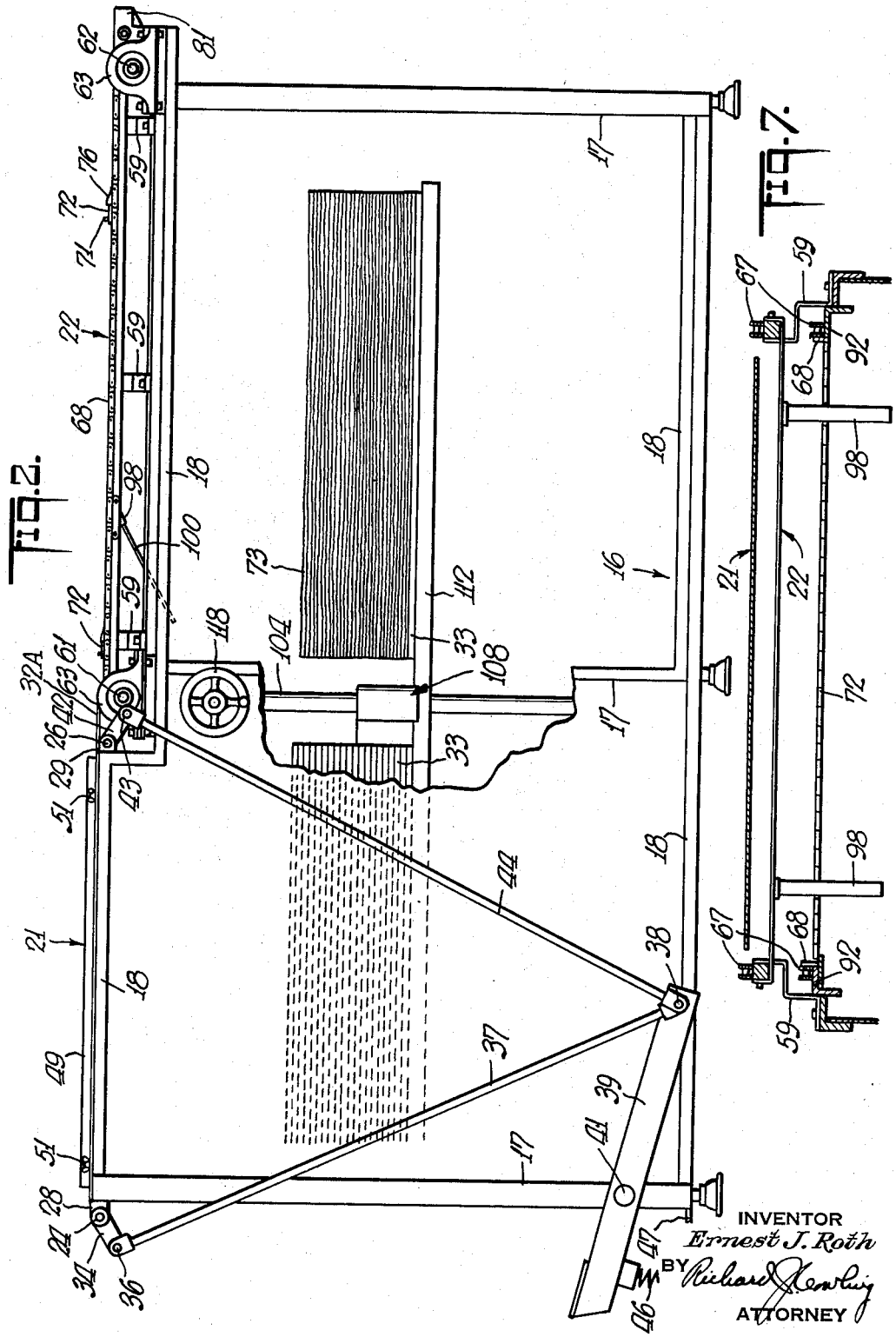

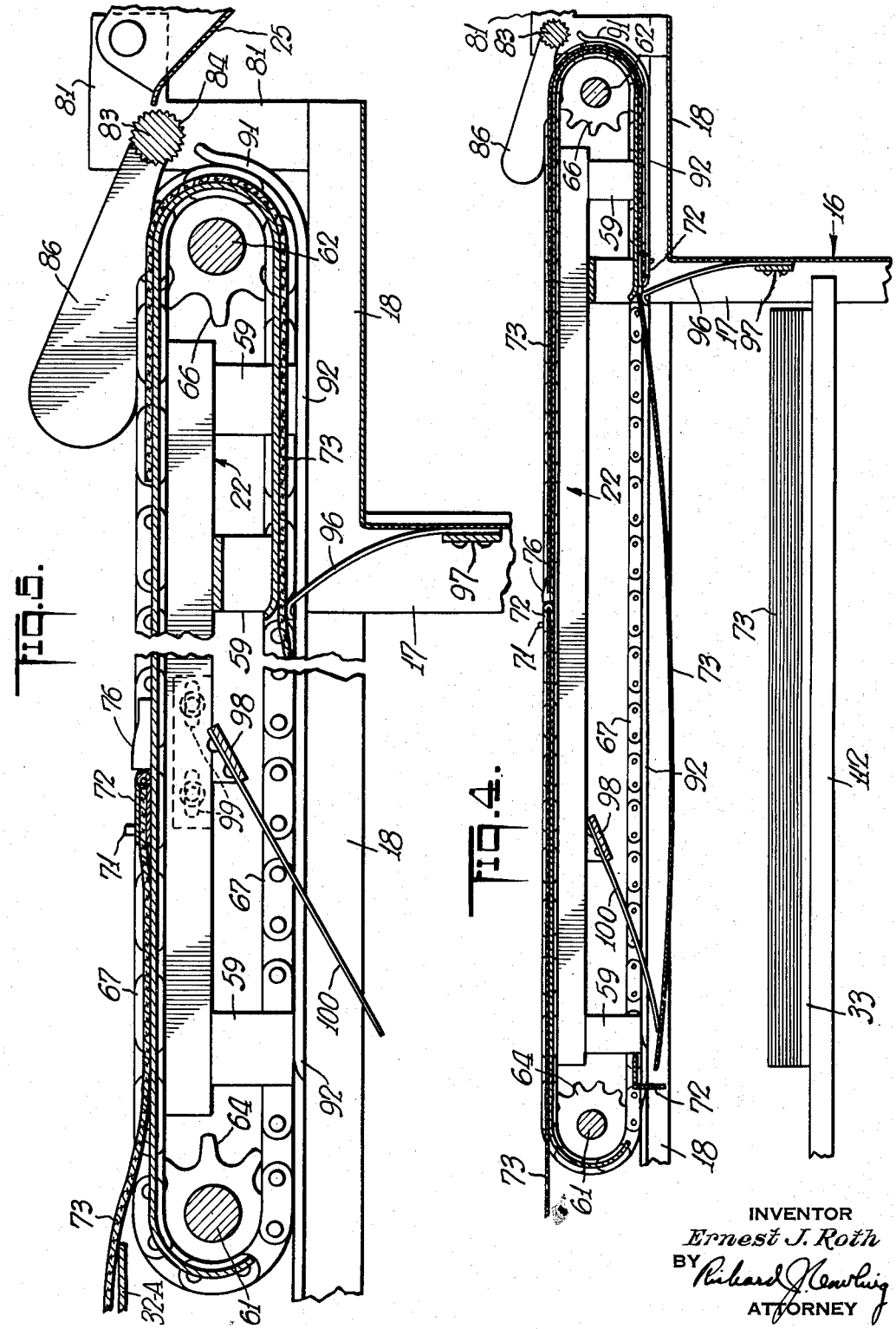

July 26, 1955  E. J. ROTH  2,713,950
PLAQUE DISCHARGING MECHANISM
Filed Sept. 19, 1951  5 Sheets-Sheet 5
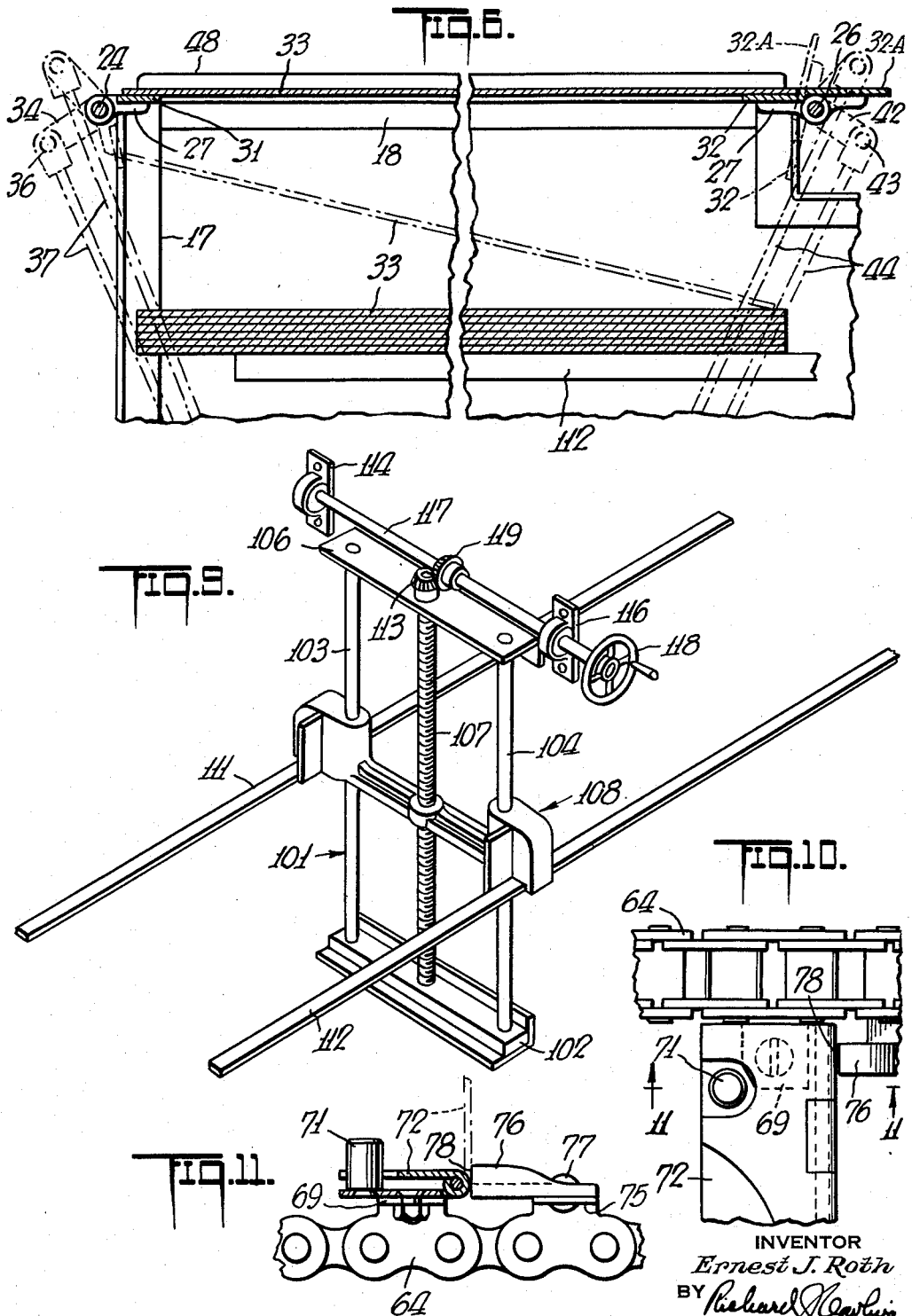
INVENTOR
Ernest J. Roth
BY
ATTORNEY

United States Patent Office 2,713,950
Patented July 26, 1955

2,713,950

PLAQUE DISCHARGING MECHANISM

Ernest J. Roth, Rockleigh, N. J., assignor to Joe Lowe Corporation, New York, N. Y., a corporation of Delaware Application September 19, 1951, Serial No. 247,308

12 Claims. (Cl. 214—309)

The present invention relates to apparatus for making doughnuts and the like, and it has particular relation to apparatus for receiving a plurality of raised dough formations reposing on a flexible apron supported by a rigid plaque, whereby the plaque is removed and the apron of dough formations is mounted on a conveyor which automatically removes the apron and feeds the raised formations into a cooking vessel or tank.

Heretofore, it has been the practice to deposit raised dough formations into wire baskets having a plurality of semi-spherical depressions or pockets substantially the size and shape of the lower half of said formations when raised. The deposited formations in such an operation are then carried by said baskets into a proofing room where they are subjected to sufficient heat and humidity to proof or raise the yeast therein. The raised dough formations are then removed from the proofing room or chamber and deposited into hot liquor in a cooking vessel by submerging their wire baskets in the hot cooking liquor until the formations rise and float free. This method of making raised doughnuts in commercial quantities is expensive and cumbersome as well as messy, since the heavy baskets are expensive, require considerable storage and must be drained free of the cooking liquor after each submersion.

The disadvantages of the aforesaid method and operation are obviated with the present invention, which receives the dough forms on their supporting plaques, discards the plaque and feeds the dough forms by their apron to a cooking vessel, whereupon the apron is removed automatically and only the raised dough formations are fed into the cooking liquor.

An object of the present invention is the provision of efficient, economical and sanitary means for feeding raised dough formations mounted on a plaque supported apron into a cooking vessel.

An object of the present invention is to provide efficient and economical means for removing the rigid supporting plaque after the apron and its supported dough formations have been attached to a traveling conveyor.

Another object of the invention is the provision of a simple, durable and economical apparatus for feeding raised dough formations mounted on an apron supported by a plaque into a cooking vessel efficiently and sanitarily while collecting the aprons and plaques in separate stacks for reloading.

A further object of the invention is to provide novel means for removing the apron from underneath the raised formations and to stack a series of such aprons in a pile whereby they may be conveniently returned for reloading.

Another object of the invention is the provision of means for stacking the removed plaques whereby they may be conveniently and quickly returned for reloading.

Other and further objects and advantages of the invention reside in the detailed construction of the several parts, which result in simplicity, economy and efficiency, and which will be apparent from the following description, wherein a preferred embodiment of the invention is shown, reference being had to the accompanying drawings, forming a part hereof, wherein like numerals indicate like parts, in which:

Figure 1 is a perspective view of apparatus constructed in accordance with the principles of the invention;

Figure 2 is a side elevational view of the apparatus shown in Figure 1;

Figure 3 is a top plan view of the apparatus shown in Figure 1;

Figure 4 is a fragmentary sectional view of the apparatus shown in Figure 3, the same having been taken substantially along the line 4—4 thereof, looking in the direction of the arrows;

Figure 5 is an enlarged fragmentary sectional view of the apparatus shown in Figure 4, showing the aprons and the release mechanism in a different position;

Figure 6 is a fragmentary sectional view of the apparatus shown in Figure 3, the same having been taken substantially along the line 6—6 thereof, looking in the direction of the arrows, and illustrating the mechanism for dropping the plaques;

Figure 7 is a fragmentary transverse sectional view of the apparatus shown in Figure 3, the same being taken substantially along the line 7—7 thereof, looking in the direction of the arrows, and showing the rail supports and assembly thereof;

Figure 8 is a fragmentary perspective view showing a conveyor chain, its guide rail and illustrating the manner in which the aprons are released;

Figure 9 is a perspective view of the elevator mechanism for collecting the plaques and aprons after removal of the dough formations;

Figure 10 is a fragmentary plan view of a hinged apron receiving means;

Figure 11 is a fragmentary transverse section taken along the line 11—11 of Figure 10, showing a hinged apron receiving means, its pin for receiving the eyelet of an apron, and a stop for limiting the opening of said apron receiving means;

Figure 12 is a perspective view of one of the aprons used to support a plurality of raised dough formations; and Figure 13 is a perspective view of one of the rigid plaques used as a base support for an apron and its dough formations.

Referring now to Figure 1 of the drawings, there is shown an assembly view of the apparatus constructed in accordance with the invention, which consists of a main supporting frame structure 16, having a plurality of spaced uprights or legs 17, a plurality of longitudinally extending brace members 18 and a plurality of transversely extending brace members 19. The receiving end of the main frame structure 16 has a plaque receiving and supporting section 21, and the remainder of said main frame structure 16 is a slightly lower and provided with a table-top supporting superstructure 22 that is substantially in horizontal alignment with the plaque receiving section 21. The apparatus 16 is adapted to be associated operatively with the receiving end of a conventional deep-fat cooking vessel 23.

The construction of the plaque receiving and supporting section 21 is best shown in Figures 3 and 6. There is extending transversely of each end of the plaque receiving section 21 shafts 24 and 26 journalled in suitable bearing supports 28 an 29. Each shaft 24 and 26 has a pair of spaced horizontal arms 27 and 27' extending inwardly therefrom. Mounted horizontally on the arms 27 and 27' and extending transversely thereof are rails 31 and 32. The rail 32, as best shown in Figure 6, is provided with an integrally formed tandem plate member 32–A, which serves to close the transverse opening between the sections 21 and 22 when said rail 32 is in its normal receiving position. The rails 31 and 32 are adapted to receive and support a rigid plaque 33, which is best shown in Figure 13. The shafts 24 and 26 extend at one end through and beyond their respective bearing supports 28 and 29, respectively. The shaft 24 has a relatively short link 34 fixedly secured thereto, which extends slightly downwardly and outwardly, and which is connected pivotally at its outer end by a pin 36 to a relatively long link member 37. The link member 37 extends downwardly and inwardly of the frame structure 16 to connect pivotally at its lower end to a stud 38 formed on the inwardly projecting end of a foot treadle 39, which is fulcrumed intermediate its ends, as indicated at 41, to the adjacent corner leg 17.

The shaft 26 also has a relatively short link 42 secured fixedly thereto, which extends downwardly and outwardly, and is connected pivotally at its outer end by a pin 43 with a relatively long link member 44 that extends downwardly and inwardly of the receiving section 21 to connect pivotally at its lower end to the stud 38 of the foot treadle 39. The foot treadle 39 is always maintained in a raised position by the spring urging means 46 which is, in turn, mounted on the upper side of a suitable supporting bracket 47 secured to the leg 17. Angular spaced rails 48 and 49 are mounted longitudinally of the receiving section 21 by means of wing nuts and bolts 51, and form suitable guides for manually positioning plaques 33 therebetween and on the supporting and receiving rails 31 and 32 in alignment with conveyor means operating over the table-top section 22.

It will be readily apparent that when foot pressure of the operator is placed on the foot treadle 39, its spring 46 will be compressed, and the inner end of said treadle 39 will force the relatively long link members 37 and 44 outwardly and upwardly, causing them first to pivot on their respective pins 36 and 43 and then force upwardly their relatively short links 34 and 42, as best shown in Figure 6, which causes, in turn, their fixed shafts 24 and 26 to rotate inwardly, thereby rotating and dropping the horizontal rail supports 31 and 32 for the plaque 33, permitting it to drop gravitationally. The arrangement of the foot treadle actuating means is so designed that the rail 32 moves slightly ahead of the rail 31, dropping the inner end of the plaque 33 slightly ahead of its outer end as best shown in dotted lines in Figure 6. This action facilitates stacking therebelow. When the foot pressure is released, the spring urging means 46 will return the mechanism including the supporting rails 31 and 32 to normal horizontal plaque receiving position. It will be obvious that when the rail 32 is returned to its normal receiving position, its tandem plate 32–A will close the opening between the sections 16 and 22.

Referring now to Figures 3, 4, 5 and 8 it will be noted that the table-top superstructure section 22 is mounted upon a plurality of spaced uprights 59 which, in turn, have been mounted on the main frame structure 16. This table-top section 22 has transversely extending shafts 61 and 62 at its opposite ends, which are journalled in suitable bearing supports 63 and have conventional sprocket wheels 64 and 66 respectively keyed thereto adjacent the opposite sides of said table-top section 22. Endless chains 67 and 68 are trained over each pair of longitudinally aligned sprocket wheels 64 and 66, and are adapted to operate along opposite sides both above and below said table-top section 22. Each chain 67 and 68 has a series of longitudinally spaced L-shaped brackets 69 (see Figure 8) mounted over certain of its links. The brackets 69 of each chain are positioned oppositely, and there is mounted therebetween a hinged book-type fastening member 72, as best shown in Figure 8. This book-type fastening member 72 has an upstanding pin 71. When the forward edge of an apron 73 has been positioned within the fastening member 72, with its forward eyelets 74 mounted over the upstanding pins 71, its hinged sections are adapted to be closed or clamped around its forward edge. The fastening members 72 are mounted in spaced relation on the chains 67 and 68 a distance slightly greater than the length of one of said aprons 73. A second L-shaped bracket 75 is mounted forwardly one link on the chain 67 from the first L-shaped bracket 69, and has a stop member 76 secured thereto by means of a rivet 77. This stop member 76 has a vertically extending rear edge 78 that limits the opening of said hinged receiving member 72 to a vertical position, as best shown in Figure 11.

There is mounted at the discharge end of the table-top superstructure 22 a pair of transversely spaced supporting brackets 81 and 82, which have a shaft 83 journalled therebetween (see Fig. 4). The shaft 83 has an enlarged longitudinally extending fluted section 84 intermediate its ends. A cam 86 is mounted freely adjacent the opposite ends of said fluted section 84. The cam members 86 are adapted to rest normally on the table-top 22 except when an apron 73 is passing thereunder. In the event the upper or top cover side of the hinged book-type fastening member 72 has not been closed by the operator when manually positioning an apron 73 therein, these spaced cam members 86 will engage said upwardly extending cover and force it downwardly into its closed position around the forward edge of said apron (see Figure 5). The purpose of the hinged fastening member 72 is to prevent the aprons 73 from falling off the pins 71 while passing around the sprocket wheels 66 and along a portion of their return below said table-top 22 until desired. When the apron 73 starts to pass around the end of the table-top 22, its dough formations 87 will be moved forwardly onto the top of the fluted roller 84. The fluted roller 84 is power driven from the conveyor chain drive shaft 62 through its keyed sprocket wheel 88, chain 89 and keyed sprocket wheel 90, as best shown in Figure 3.

Referring now to Figures 4 and 5, arcuate guide members 91 are spaced outwardly from the sprocket wheels 66, and serve to prevent the hinged fastening members 72 from opening as they pass therearound. Formed integrally with the lower ends of these arcuate guide members 91 are suitable horizontally extending extension rails 92. These extension rails 92 serve to maintain the hinged fastening members 72 closed for a substantial distance inwardly below the table-top structure 22. The discharge end of one of these extension rails 92 is shown clearly in Figure 8, and it will be noted that as soon as a fastening member 72 has cleared the inward ends of the rail supports 92, it tends to open gravitationally, as shown clearly by the dotted line position thereof. A pair of transversely spaced upwardly extending spring guide supports 96 are secured by rivets to a transversely extending cross-bar 97 mounted between opposite legs 17 of the main frame structure 16. These spring supporting guides 96 project upwardly between the rails 92 and serve to maintain the trailing side portions of the aprons 73 in substantially horizontal alignment until its forward fastening member 72 has cleared the ends of the rails 92.

There is mounted transversely under the superstructure 22 an adjustable U-shaped bracket 98, which is slidable longitudinally of the table-top 22 within the limits of the slots 99. A pair of transversely spaced downwardly projecting guide arms 100 are secured by conventional rivets to the cross-arm of the bracket 98, which is shown extending at an angle declining with respect to the table-top 22. The lower ends of each of the guide arms 100 extend rearwardly to a point immediately adjacent the ends of the supporting rails 92. These guide arms 100 are adapted to engage frictionally the top sides of the aprons 73 adjacent their opposite edges as they pass therebelow, exerting a slight downward pressure thereon, which is sufficient to cause their hinged fastening members 72 to open as they leave the ends of the supporting rails 92 and force the eyelets 74 of the aprons 73 off the fastening pins 71 thereof. It will thus be seen that the guide members 96 and 100 insure a positive and a relatively flat discharge of said aprons 73 from the lower run of the conveyor, which permits them to fall flat and in a stacked position on an elevator 101 therebelow.

The elevator 101, which is best shown in Figures 1 and 9, is mounted below both the plaque receiving section 21 and the table-top superstructure 22. The elevator 101 consists of a main supporting base member 102, having a pair of spaced upstanding supporting guide rods 103 and 104 which is, in turn, welded or otherwise secured to the underside of the main frame structure 16. An intermediate rod 107, which is threaded throughout its length, is suitably journalled in bearings mounted in the base plate 102 and the top plate 106, and serves as the means for raising and lowering the elevator carriage. The elevator carriage consists of a supporting frame structure 108 mounted slidably on the side guide rods 103 and 104, and having an internally threaded aperture through its vertical axis adapted to engage threadingly the intermediate rod 107. The frame structure 108 has a pair of supporting arms 111 and 112 mounted longitudinally thereof along opposite sides. The supporting arms 111 and 112 are fixedly secured to the carriage 108 and extend in opposite directions substantially the length of the main frame structure 16.

The upper end of the threaded rod 107 projects through the top plate 106, and has a beveled gear 113 keyed thereto. Suitable brackets 114 and 116 which are mounted on the main frame structure 16 in any convenient manner support a transversely extending shaft 117, which projects outwardly of the frame structure along one side thereof. A hand wheel 118 is keyed to the projecting end of the shaft 117, and serves as a means for rotating the same in either direction. The shaft 117 also has a beveled gear 119 keyed thereto intermediate its ends so as to mesh with the beveled gear 113 of the threaded rod 107. It will be obvious from this construction that there is provided below the main frame structure 16 a manually operable elevator for collecting the plaques 33 and the aprons 73. By using an elevator such as described, the stacking and collecting platform, which consists of the supporting arms 111 and 112, may be moved close to the point of discharge of both the plaques 33 and the aprons 73 so that the first plaques and aprons will have only a short distance to drop and will therefore maintain a substantially horizontal position while dropping. As the stacks increase in thickness, the elevator 108 may be lowered manually by its hand wheel 118. When sufficiently large stacks are formed of the plaques 33 and aprons 73, an operator may manually remove them to the loading operation and thereupon raise the elevator for beginning of another cycle of operation.

There is shown in Figure 1 a simple method of driving the conveyor chains 67 and 68 for drawing the aprons 73 over the table-top superstructure 22 and back underneath the same until they are discharged onto the elevator 101. In this construction, the shaft 62 projects outwardly from one side of the main frame structure 16, and has a sprocket wheel 121 keyed thereto. A chain 122 operating over said sprocket wheel 121 is also trained over a second sprocket wheel 123 keyed to a shaft 124 extending outwardly from the cooking vessel 23, which, in turn, is connected in any suitable manner with the drive mechanism of the conveyor 25–A thereof.

In describing the operation of the apparatus, it will be assumed that the conveyor chains 67 and 68 are being driven. All of the operations of the machine can be handled by one operator. He removes an assembled unit, consisting of a rigid supporting plaque 33, apron 73 and a series of spaced dough formations 87, from a proofing rack (not shown) and manually deposits it on the receiving rails 31 and 32 between the guide rails 48 and 49. He then grasps the forward edge of the apron 73 and quickly draws or slides it forwardly of the apparatus over the tandem plate 32–A and table-top 22 until he can position its forward eyelets 74 over the pins 71 of the hinged receiving member 72, which he has previously opened. This positioning of the apron eyelets 74 over the pins 71 can be readily accomplished with the conveyor chains in continuous operation. Once the aprons 73 are hooked onto the pins 71, the conveyor chains 67 and 68 will draw or slide it longitudinally of the table-top superstructure 22, and automatically discharge the dough forms and the apron. The operator then turns to the proofing rack for another assembly.

When the operator is ready to position a second assembled unit on the receiving rails 31 and 32, he must first step on the foot treadle 39 to remove the empty plaque 33 therefrom by dropping it downwardly onto the elevator arms 111 and 112. He then repeats the operation of hooking the second apron on the next succeeding set of pins 71. There will be sufficient time during his previously described duties to manipulate the elevator carriage 101, or, if necessary, this may be done by letting a set of pins 71 pass without placing an apron thereon.

In the event the operator should forget to close the hinged apron receiving means 72 when positioning an apron therein, its upstanding cover section will strike the cam levers 86 positioned adjacent the discharge end, and these cams will force said top cover section into a closed position before passing the same around the end sprocket wheels 66 of the conveyor chains 67 and 68. It will be noted that the power driven fluted roller 84 is very close to the end of the table-top 22 and is in horizontal alignment therewith. Its position is such that the aprons 73 will pass between the end of the table-top 22 and the fluted roller 84 while their dough formations will be forced over the top of said fluted roller into the receiving chute 25, which discharges them onto the receiving conveyor 25–A of the cooking vessel 23.

The hinged apron receiving means 72 will remain closed while passing around the sprocket wheels 66 because of the arcuate guide rails 91 (see Figure 5). The horizontal guide rail extensions 92 also serve to maintain said hinged apron receiving means 72 closed for a substantial distance along the lower return run of the conveyor chains 67 and 68. When said hinged apron receiving means 72 clears the ends of the extension rails 92, they will tend to open gravitationally, as best shown in Figure 8.

The upwardly extending spring guide supports 96 tend to maintain the trailing portion of the aprons 73 in a horizontal position until after the hinged receiving means 72 has cleared the extension rails 92. The downwardly extending arms 100 engage the aprons 73 frictionally from their top sides adjacent the end of its lower run forcing their hinged receiving means 72 open if they have not opened gravitationally. These guide members 96 and 100 tend to maintain the flexible aprons 73 open and in a relatively horizontal position so that they will drop flat in a stacked position onto the elevator 101 therebelow. The elevator carriage 108 consists merely of a pair of arms 111 and 112 for receiving the aprons 73. Obviously, the flexible aprons 73 would not remain supported by such arms. Therefore, it is customary for the operator to position a rigid plaque 33 over said spaced arms 111 and 112, as shown in Figure 1, to receive and support the discharged aprons. The stack of such discharged aprons 73 may then be transferred to the reloading apparatus by means of such supporting plaque.

Although I have only described in detail and illustrated in the drawings one form of the invention, it will be readily apparent to those skilled in the art that the same need not be so limited, but that various modifications may be made therein without departing from the spirit thereof.

What I claim is:

1. Apparatus for handling and feeding raised dough formations including a supporting structure, a pair of spaced supporting rails adjacent one end of said structure adapted to support a rigid plaque containing a flexible apron having a plurality of raised dough formations spaced thereon, a table-top surface covering a portion of said structure, an endless conveyor operating over and under said table-top surface, said conveyor having a plurality of longitudinally spaced apron receiving means extending transversely thereof and adapted to receive one edge of an apron, means for withdrawing said rail supports to drop said plaques below said rail supports, and means for operating said conveyor.

2. Apparatus for handling and feeding raised dough formations including a supporting structure, a pair of spaced supporting rails adjacent one end of said structure adapted to support a rigid plaque containing a flexible apron having a plurality of raised dough formations spaced thereon, a table-top surface covering a portion of said structure, an endless conveyor operating over and under said table-top surface, said conveyor having a plurality of longitudinally spaced hinged apron receiving means extending transversely thereof and adapted to receive one edge of an apron, stop means for limiting the opening of said apron receiving means, means for withdrawing said rail supports to drop said plaques below said rail supports, and means for operating said conveyor.

3. Apparatus for handling and feeding raised dough formations including a supporting structure having a pair of spaced rails at its receiving end adapted to support a rigid plaque containing a flexible apron having a plurality of raised dough formations thereon, a table-like supporting surface covering the remainder of said supporting structure, an endless conveyor operating over said table-like surface, said conveyor having a plurality of longitudinally spaced apron receiving means extending transversely thereof adapted to receive one edge of said apron, means for maintaining said apron receiving means in a closed position along the first portion of its return below said structure, means for engaging said apron to force it from said receiving means, and means for operating said conveyor.

4. Apparatus for handling and feeding raised dough formations including a supporting structure, a pair of spaced supporting rails adjacent the receiving end of said supporting structure adapted to support a rigid plaque containing a flexible apron having a plurality of raised dough formations spaced thereon, a table-top surface covering the remainder of said structure, endless chains operating along opposite sides of said table-top, said chains having a plurality of longitudinally spaced apron receiving means mounted transversely thereon adapted to close around the forward edge of said apron, means for discharging said plaques from said rail supports, means mounted below the discharge end of said chains for maintaining said apron receiving means in a closed position over the first portion of its return run, means mounted adjacent the end of said return run for disengaging said aprons from said receiving means, and means for operating said chains.

5. Apparatus for handling and feeding raised dough formations including a frame structure, a pair of transversely spaced horizontal supporting rails mounted adjacent one end of said frame structure adapted to support a rigid plaque containing a flexible apron having a plurality of raised dough formations thereon, a table-top surface covering the remainder of said frame structure in substantially horizontal alignment with said rails, a pair of transversely spaced endless chains operating along opposite sides of said table-top surface and above and below the same, a plurality of longitudinally spaced hinged apron receiving means mounted between said chains, spaced rails mounted below said table top and along the first portion of the return of said chains for maintaining said hinged apron receiving means in a closed position, means mounted beyond said apron receiving means supporting rails for supporting said apron, and means for operating said chains.

6. Apparatus for handling and feeding raised dough formations including a frame structure, a pair of transversely spaced horizontal supporting rails mounted adjacent one end of said frame structure adapted to support a rigid plaque containing a flexible apron having a plurality of raised dough formations thereon, a table-top surface covering the remainder of said frame structure in substantially horizontal alignment with said rails, a pair of transversely spaced endless chains operating along opposite sides of said table-top surface and above and below the same, a plurality of longitudinally spaced hinged apron receiving means mounted between said chains, means carried by said chains to limit the opening of said hinged apron receiving means, spaced rails mounted below said table top and along the first portion of the return of said chains for maintaining said hinged apron receiving means in a closed position, means mounted beyond said apron receiving means supporting rails for supporting said apron, and means for operating said chains.

7. Apparatus for handling and feeding raised dough formations including a frame structure, a pair of transversely spaced supporting rails mounted adjacent one end of said frame structure adapted to support a rigid plaque containing a flexible apron having a plurality of raised dough formations thereon, a table-top surface covering the remainder of said frame structure in substantially horizontal alignment with said rails, a pair of transversely spaced endless chains operating along opposite sides of a portion of said table-top surface and above and below the same, a plurality of longitudinally spaced hinged apron receiving means mounted between said chains, spaced rails mounted below said table top and along the first portion of the return of said chains for maintaining said hinged apron receiving means in a closed position, means mounted below said apron and adjacent the ends of said apron supporting rails for supporting said apron, means mounted adjacent the end of the lower run of said chains and above said apron for discharging the same from its hinged receiving means, and means for operating said chains.

8. Apparatus for handling and feeding raised dough formations including a frame structure, a pair of transversely spaced supporting rails mounted adjacent one end of said frame structure adapted to support a rigid plaque containing a flexible apron having a plurality of raised dough formations spaced thereon, means for withdrawing said rails to drop said plaque, a table-top supporting surface covering the remainder of said frame structure in substantially horizontal alignment with said rails, a pair of transversely spaced endless chains operating above and below said table-top surface and along opposite sides thereof, an elevator extending horizontally below said supporting rails and the lower return of said chains, means for raising and lowering said elevator, a plurality of longitudinally spaced hinged apron receiving means mounted between said chains, spaced rails below said table top along the first portion of the return of said chains for maintaining said hinged apron receiving means in a closed position, means for discharging said apron from said hinged apron receiving means intermediate the ends of said elevator, and means for operating said conveyor chains.

9. Apparatus for handling and feeding raised dough formations including a frame structure, a pair of transversely spaced rails mounted adjacent one end of said frame structure adapted to supported a rigid plaque containing a flexible apron having a plurality of raised dough formations thereon, a table-top surface covering the remainder of said frame structure in substantial alignment with said rails, a pair of transversely spaced endless chains operating along opposite sides of said table top and above and below the same, a plurality of longitudinally spaced upwardly hinged apron receiving means mounted transversely of said table top between said chains, means adjacent the discharge end of said chains for closing said upwardly extending hinges, spaced rails mounted below the first portion of the return of said chains for maintaining said hinged apron receiving means in a closed position, means adjacent the end of the lower run of said chains adapted to engage said aprons and discharge them from said hinged means, and means for driving said conveyor chains.

10. Apparatus for handling and feeding raised dough formations including a frame structure, a pair of transversely spaced supporting rails mounted adjacent one end of said frame structure adapted to support a rigid plaque containing a flexible apron having a plurality of raised dough formations spaced thereon, means including a foot treadle for withdrawing said rails to drop said plaque, a table-top supporting surface covering the remainder of said frame structure in substantially horizontal alignment with said rails, a pair of transversely spaced endless chains operating above and below said table-top surface and along opposite sides thereof, an elevator extending horizontally below said supporting rails and the lower return of said chains, means for raising and lowering said elevator, a plurality of longitudinally spaced hinged apron receiving means mounted between said chains, means for limiting the opening of said apron receiving means, guide rails spaced around the discharge end of said chains and below the first portion of the return of said chains for maintaining said hinged apron receiving means in a closed position, means for engaging said apron from above to force the same from said apron receiving means onto said elevator, and means for operating said conveyor chains.

11. Apparatus for handling and feeding raised dough formations including a frame structure, a pair of transversely spaced pivotally mounted rails adjacent one end of said frame structure adapted to support a rigid plaque containing a flexible apron having a plurality of raised dough formations spaced thereon, means for moving said hinged rails to drop the plaque therebelow, means for returning said hinged rails to normal plaque receiving position, a table-top supporting surface covering the remainder of said frame structure in substantially horizontal alignment with said hinged rails, a pair of transversely spaced endless chains operating above and below said table-top surface along opposite sides thereof, an elevator extending horizontally below said hinged rails and the lower return of said chains, means for raising and lowering said elevator, a plurality of longitudinally spaced hinged apron receiving means mounted between said chains, means adjacent the discharge end of the upper run of said chains for closing said hinged receiving means, spaced rails mounted below the first portion of the return of said chains for maintaining said hinged apron receiving means in a closed position, means for discharging said apron from its receiving means intermediate the ends of said elevator, and means for operating said conveyor chains.

12. Apparatus for handling and feeding raised dough formations including means for receiving the raised dough formations on an apron supported by a rigid plaque, means for dropping said plaque, means for collecting said plaques in a stacked condition, means for conveying said apron to the discharge end of said apparatus for discharging said dough formations, means for releasing said apron from said conveying means, means for collecting aprons in a stacked condition, and means for operating said conveyor.

References Cited in the file of this patent

UNITED STATES PATENTS

| Number | Name | Date |
|---|---|---|
| 364,890 | Boucher | June 14, 1887 |
| 1,164,802 | Freeman | Dec. 21, 1915 |
| 1,672,522 | Greer et al. | June 5, 1928 |
| 2,106,171 | Fogelson | Jan. 25, 1938 |
| 2,251,197 | Nestmann | July 29, 1941 |
| 2,527,687 | Stock | Oct. 31, 1950 |